United States Patent
Kamei et al.

(10) Patent No.: US 10,464,608 B2
(45) Date of Patent: Nov. 5, 2019

(54) FRONT STRUCTURE OF MOTOR VEHICLE

(71) Applicant: MAZDA MOTOR CORPORATION, Hiroshima (JP)

(72) Inventors: Takehiro Kamei, Hiroshima (JP); Masanobu Hanazaki, Hiroshima (JP); Katsuyuki Komiya, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/034,119

(22) Filed: Jul. 12, 2018

(65) Prior Publication Data

US 2019/0039652 A1    Feb. 7, 2019

(30) Foreign Application Priority Data

Aug. 3, 2017 (JP) ................................ 2017-150806

(51) Int. Cl.
| | |
|---|---|
| *B62D 21/11* | (2006.01) |
| *B62D 21/03* | (2006.01) |
| *B62D 25/08* | (2006.01) |

(52) U.S. Cl.
CPC .............. *B62D 21/11* (2013.01); *B62D 21/03* (2013.01); *B62D 25/081* (2013.01); *B62D 25/082* (2013.01); *B62D 25/088* (2013.01)

(58) Field of Classification Search
CPC .... B62D 21/11; B62D 25/088; B62D 25/082; B62D 21/03; B62D 25/081
USPC ..................................................... 296/187.12
See application file for complete search history.

(56) References Cited

U.S. PATENT DOCUMENTS

| | | | |
|---|---|---|---|
| 2004/0056515 A1 | 3/2004 | Nomura | |
| 2018/0354559 A1* | 12/2018 | Nakauchi | ............. B62D 25/088 |
| 2018/0370576 A1* | 12/2018 | Shibata | ................ B62D 25/081 |

FOREIGN PATENT DOCUMENTS

| | | |
|---|---|---|
| CN | 102795264 A | 11/2012 |
| JP | 2004-106704 A | 4/2004 |
| JP | 2017-007606 A | 1/2017 |

* cited by examiner

*Primary Examiner* — Pinel E Romain
(74) *Attorney, Agent, or Firm* — Studebaker & Brackett PC (57) ABSTRACT

A front structure of a motor vehicle includes a pair of left and right front side frames, a pair of left and right apron reinforcements, and reinforcing members extending in a vertical direction to couple the left front side frame to the left apron reinforcement, and the right front side frame to the right apron reinforcement. Each reinforcing member is provided on a surface, facing outside in a width direction of the motor vehicle, of a peripheral wall of a suspension tower, and forms a closed cross section with a portion of the peripheral wall.

12 Claims, 9 Drawing Sheets

RIGHT ⟵⟶ LEFT

FIG.9

RIGHT ⟵⟶ LEFT

FRONT STRUCTURE OF MOTOR VEHICLE

CROSS-REFERENCE TO RELATED APPLICATION

This application claims priority to Japanese Patent Application No. 2017-150806 filed on Aug. 3, 2017, the entire disclosure of which is incorporated by reference herein.

BACKGROUND

The present disclosure relates to a front structure of a motor vehicle.

A front structure of a motor vehicle has been known. In such a structure, components such as front side frames and a cowl member are coupled together in a vertical direction to obtain a front vehicle structure which is annular when viewed in a longitudinal direction of the vehicle.

For example, Japanese Unexamined Patent Publication No. 2017-007606 discloses a front structure of a motor vehicle. The front structure includes: front side frames extending in a longitudinal direction of the vehicle; upper members (apron reinforcements) disposed above, and outside in a width direction of the vehicle of, the front side frames; damper housings (suspension towers) each extending in a vertical direction to couple an associated pair of the front side frame and the upper member, and having a wall surface facing an engine compartment in the width direction of the vehicle; damper housing reinforcements each extending vertically along the wall surface of the damper housing and being joined to an associated one of the front side frames; a dash panel reinforcement (cowl member) disposed above the front side frames and extending in the width direction of the vehicle; corner reinforcements each connecting an upper end of an associated one of the damper housing reinforcements to the dash panel reinforcement; and a front sub-frame coupling the left and right front side frames. These frames and components form a front structure with an annular skeleton which is annular when viewed in the longitudinal direction of the vehicle.

SUMMARY

According to the structure disclosed by Japanese Unexamined Patent Publication No. 2017-007606, the damper housing reinforcements can ensure the rigidity against a load applied to the suspension towers in the vertical direction. If a load is applied from outside in the width direction of the vehicle to the suspension tower, particularly via the apron reinforcement, the suspension tower may be deformed because it receives most of the load. If the suspension tower were deformed upon receiving the load applied in the width direction of the vehicle, the adhesion of front wheels of the motor vehicle to a road surface, i.e., a camber angle, would vary, and the steering stability would be affected.

In view of the foregoing background, it is therefore an object of the present disclosure to improve the overall rigidity of a front portion of the vehicle, and improve the rigidity of the suspension towers against a load applied in the width direction of the vehicle.

To achieve the object, the present disclosure is directed to a front structure of a motor vehicle. The front structure of the motor vehicle includes: a pair of left and right front side frames respectively disposed at ends of an engine compartment of the motor vehicle in a width direction of the motor vehicle and extending in a longitudinal direction of the motor vehicle; a pair of left and right apron reinforcements respectively disposed above, and further outside in the width direction of the motor vehicle than, the left and right front side frames, the apron reinforcements extending in the longitudinal direction of the motor vehicle; a pair of left and right suspension towers standing upright to couple the left front side frame to the left apron reinforcement, and the right front side frame to the right apron reinforcement, each of the suspension towers bulging further toward the engine compartment than an associated one of the apron reinforcements; a suspension cross member disposed below the left and right front side frames and connecting the left and right front side frames in the width direction of the motor vehicle; and a cowl member extending in the width direction of the motor vehicle to be coupled to the apron reinforcements, wherein each of the suspension towers includes a top on which a damper of a front wheel suspension is mounted, and a peripheral wall provided along a periphery of the top facing the engine compartment and covering the damper from the engine compartment, a reinforcing member is provided on a surface, facing outside in the width direction of the motor vehicle, of the peripheral wall of each suspension tower, the reinforcing members extending in a vertical direction and the width direction of the motor vehicle to couple the left front side frame to the left apron reinforcement, and the right front side frame to the right apron reinforcement, and a portion of each of the peripheral walls and an associated one of the reinforcing members form a closed cross section.

In this configuration, the front side frames, the apron reinforcements, the suspension cross member, the suspension towers, the cowl member, and the reinforcing members form a vehicle structure which is annular when viewed in the longitudinal direction of the vehicle. This can improve the overall rigidity of the front portion of the vehicle, in particular, the rigidity against the loads applied in the width direction of the vehicle and the vertical direction.

Each reinforcing member thus provided can receive a load, if applied from outside in the width direction of the vehicle to the suspension tower via the apron reinforcement, for example. This can reduce the deformation of the suspension tower. Further, if a load is applied to the suspension tower from inside in the width direction of the vehicle (from the engine compartment), the reinforcing member becomes tense against the apron reinforcement so that the reinforcing member and the apron reinforcement can appropriately receive the load. This can reduce the deformation of the suspension tower. Thus, the suspension tower can be provided with improved rigidity against the load applied in the width direction of the vehicle.

Moreover, the reinforcing member provided on the surface, facing outside in the width direction of the vehicle, of the peripheral wall of the suspension tower can ensure flexible layout of on-vehicle components to be arranged in the engine compartment.

In the front structure of the motor vehicle, each of the front side frames may have a closed cross section, and a rib may be disposed in an interior of each front side frame to divide the interior in the longitudinal direction of the motor vehicle, the rib extending from a junction between the reinforcing member and the front side frame to a junction between the suspension cross member and the front side frame.

In this configuration, the rib couples the junction between the reinforcing member and the front side frame to the junction between the suspension cross member and the front side frame. Thus, the annular structure comprised of the above-described components such as the front side frames can further improve the rigidity of the front portion of the vehicle body.

In the front structure of the motor vehicle including the rib disposed in each front side frame, the rib may have a U-shaped cross section which opens inward or outward in the width direction of the motor vehicle.

Having such a U-shaped cross section, the rib can further improve its rigidity, in particular against the load applied in the vertical direction, than a rib in the shape of a flat plate. This can further improve the rigidity of the front portion of the vehicle body.

In the front structure of the motor vehicle, the suspension cross member may include a cross member body extending in the width direction of the motor vehicle, the suspension cross member may be coupled to the front side frames via frame joints respectively extending upward from ends of the cross member body, the ends being toward outside in the width direction of the motor vehicle, and toward the front of the motor vehicle, a cross member reinforcement extending in the width direction of the motor vehicle may be detachably attached to a front end of the cross member body, and a front end of the cross member reinforcement may be positioned further forward than the frame joints when viewed from a lateral side of the motor vehicle.

In this configuration, the cross member reinforcement can increase the effective dimension of the cross member body in the longitudinal direction of the vehicle. This can improve the rigidity of the suspension cross member itself, and the annular structure including the suspension cross member can further improve the rigidity of the front portion of the vehicle body.

The cross member reinforcement is detachably attached to the cross member body. Therefore, if the cross member reinforcement becomes an obstacle to the maintenance of the engine, for example, the cross member reinforcement can be detached before the maintenance. This can reduce the possible decrease in engine maintainability as compared with the cases where the cross member body itself is upsized.

According to an embodiment of the front structure of the motor vehicle, each of the reinforcing members includes: a first reinforcement extending in the vertical direction, being attached to a surface of the peripheral wall of the suspension tower facing outside in the width direction of the motor vehicle to form a closed cross section with a portion of the peripheral wall, and being coupled to the cowl member; and a second reinforcement extending in the width direction of the motor vehicle to couple the first reinforcement to the apron reinforcement.

In this configuration, if the first reinforcement is coupled to the cowl member, for example, an additional annular structure including the front side frames and the cowl member coupled together without the apron reinforcements can be provided in addition to the annular structure including the apron reinforcements. This can further improve the rigidity of the front portion of the vehicle body.

The front structure of the motor vehicle may further include: a pair of wheel apron panels each extending in the vertical direction, and being joined to a front end of the peripheral wall of an associated one of the suspension towers, the wheel apron panels coupling the left front side frame to the left apron reinforcement, and the right front side frame to the right apron reinforcement, wherein each reinforcing member may be positioned behind an associated one of the suspension towers, a front reinforcing member may be disposed in front of each suspension tower on a surface, facing outside in the width direction of the motor vehicle, of each of the wheel apron panels, the front reinforcing members being different from the reinforcing members, each of the wheel apron panels and an associated one of the front reinforcing members may form a closed cross section.

In this configuration, a set of the front side frame, the apron reinforcement, the reinforcing member, the wheel apron panel, and the front reinforcing member can form an annular structure surrounding the periphery of a damper mount provided for the suspension tower. This can improve the rigidity of the periphery of the damper mount against loads applied in the longitudinal and width directions of the vehicle and the vertical direction. This can further improve the overall rigidity of the suspension tower.

DETAILED DESCRIPTION

A front structure of a motor vehicle disclosed herein will be described in detail below with reference to the drawings. In the following description, the front, rear, left, right, top, and bottom sides of a motor vehicle 1 will be simply referred to as the "front," "rear," "left," "right," "top," and "bottom," respectively.

Figure 1:
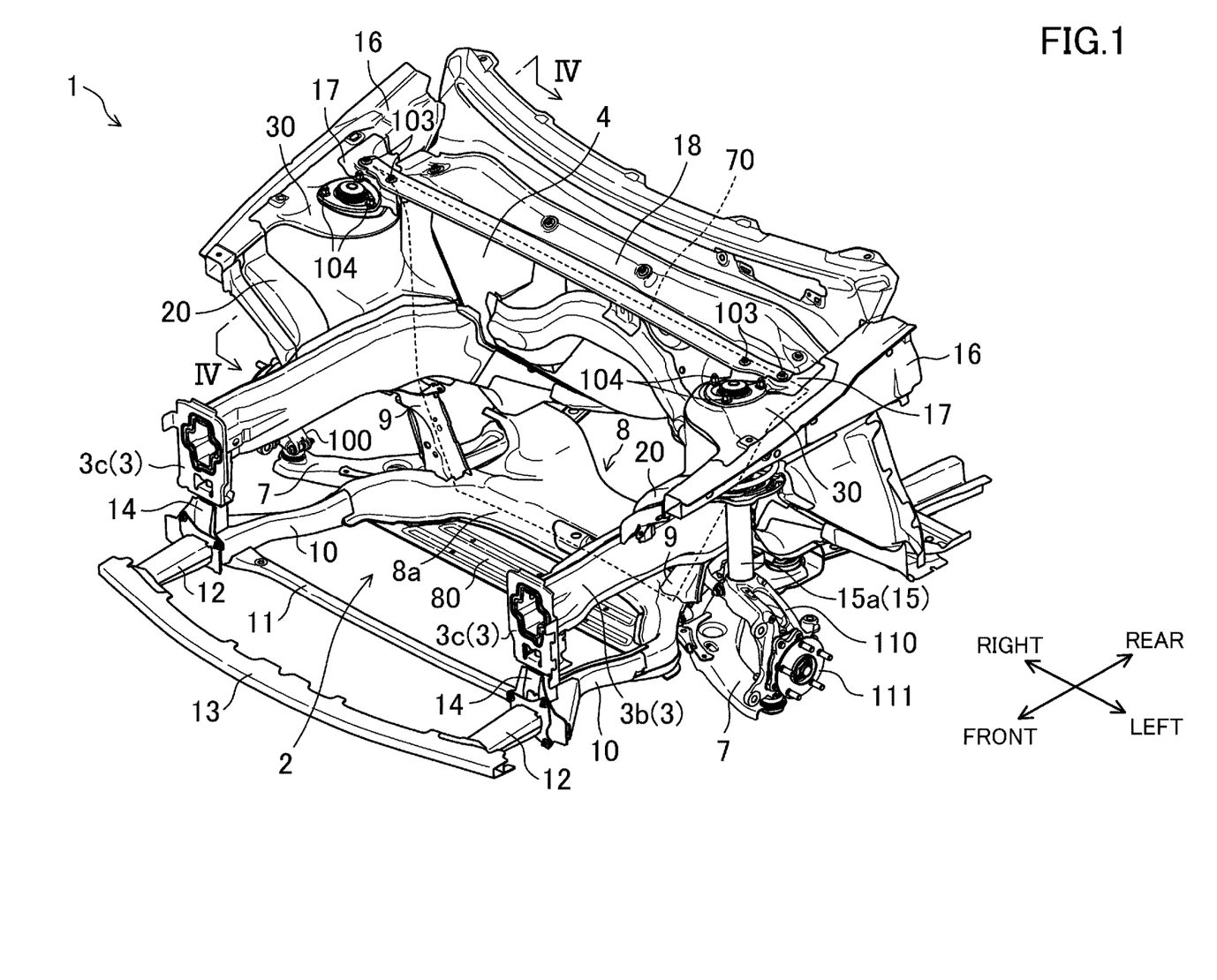
FIG. 1 is a top left perspective view illustrating a front portion of a motor vehicle to which a front structure according to an exemplary embodiment is applied.

FIG. 1 illustrates a front portion of the motor vehicle 1 to which a front structure according to an exemplary embodiment is applied. The motor vehicle 1 includes, in a front portion thereof, an engine compartment 2 in which an engine (not shown) for driving front wheels (not shown) of the motor vehicle 1, and a transmission (not shown) are disposed. The engine is transversely placed in the engine compartment 2, and the transmission is to be disposed on the left of the engine.

Left and right front side frames 3, which are paired, extend in a longitudinal direction of the motor vehicle 1 (hereinafter simply referred to as the "longitudinal direction") at ends of the engine compartment 2 in a width direction of the motor vehicle 1 (hereinafter simply referred to as the "width direction"). The engine and the transmission are disposed between the left and right front side frames 3.

Each of the left and right front side frames 3 forms a closed cross section substantially in the shape of a rectangle. Specifically, the closed cross section of each front side frame 3 is formed by an inner frame 3a and an outer frame 3b. The inner frame 3a has a U-shaped cross section which opens outward in the width direction (see FIGS. 8 and 9). The outer frame 3b is substantially in the shape of a flat plate, and couples an end of an upper wall portion of the inner frame 3a toward the outside in the width direction to an end of a lower wall portion of the inner frame 3a toward the outside in the width direction. The front side frames 3 respectively have kicked rear portions whose level gradually decreases toward the rear side. A dash panel 4 as a partition between the engine compartment 2 and a cabin is provided at a position corresponding to the kicked portions in the longitudinal direction.

A flange 3c is formed at a front end of each of the front side frames 3. Although not shown, a rear end of a crash can (not shown) whose front end is coupled to a bumper beam is fastened to each flange 3c.

In the front portion of the motor vehicle 1, a pair of left and right front wheel suspension arms 7 is provided below the front side frames 3 at a position corresponding to the kicked portions of the front side frames 3 in the longitudinal direction. The front wheel suspension arms 7 respectively support the left and right front wheels. A suspension cross member 8 extends in the width direction to support the front wheel suspension arms 7. The "suspension cross" will be hereinafter abbreviated as "SC."

The SC member 8 includes an SC body 8a (cross member body) which is X-shaped when viewed from above, and extends in the width direction. Left and right rear ends of the SC body 8a respectively support rear ends of the left and right front wheel suspension arms 7 attached thereto. Thus, the front wheels are supported by the SC body 8a via the front wheel suspension arms 7. Rear frame joints 9 (frame joints) are provided to extend upward and outward in the width direction from left and right front ends of the SC body 8a, respectively. Each of the rear frame joints 9 is coupled to a lower wall portion of an associated one of the front side frames 3 (the inner frame 3a in a strict sense). Thus, the SC body 8a and the left and right front side frames 3 are coupled together, i.e., the SC member 8 couples the left and right front side frames 3 together in the width direction. As will be described in detail later, each rear frame joint 9 is connected to the front side frame 3 via bolts fastened to a weld nut 90 disposed inside the front side frame 3.

Left and right front extensions 10 respectively extend forward from the left and right front ends of the SC body 8a. A front cross member 11 extending in the width direction between front ends of the left and right front extensions 10 couples side surfaces, facing the inside in the width direction, of the front ends together. A stiffener 13 for protecting pedestrians is fixed to the front ends of the front extensions 10 via joints 12 so that the stiffener 13 protrudes forward from the front extensions 10. The front ends of the left and right front extensions 10 are respectively coupled to the front ends of the lower wall portions of the left and right front side frames 3 (the inner frames 3a in a strict sense) via front frame joints 14 extending in the vertical direction.

Figure 2:
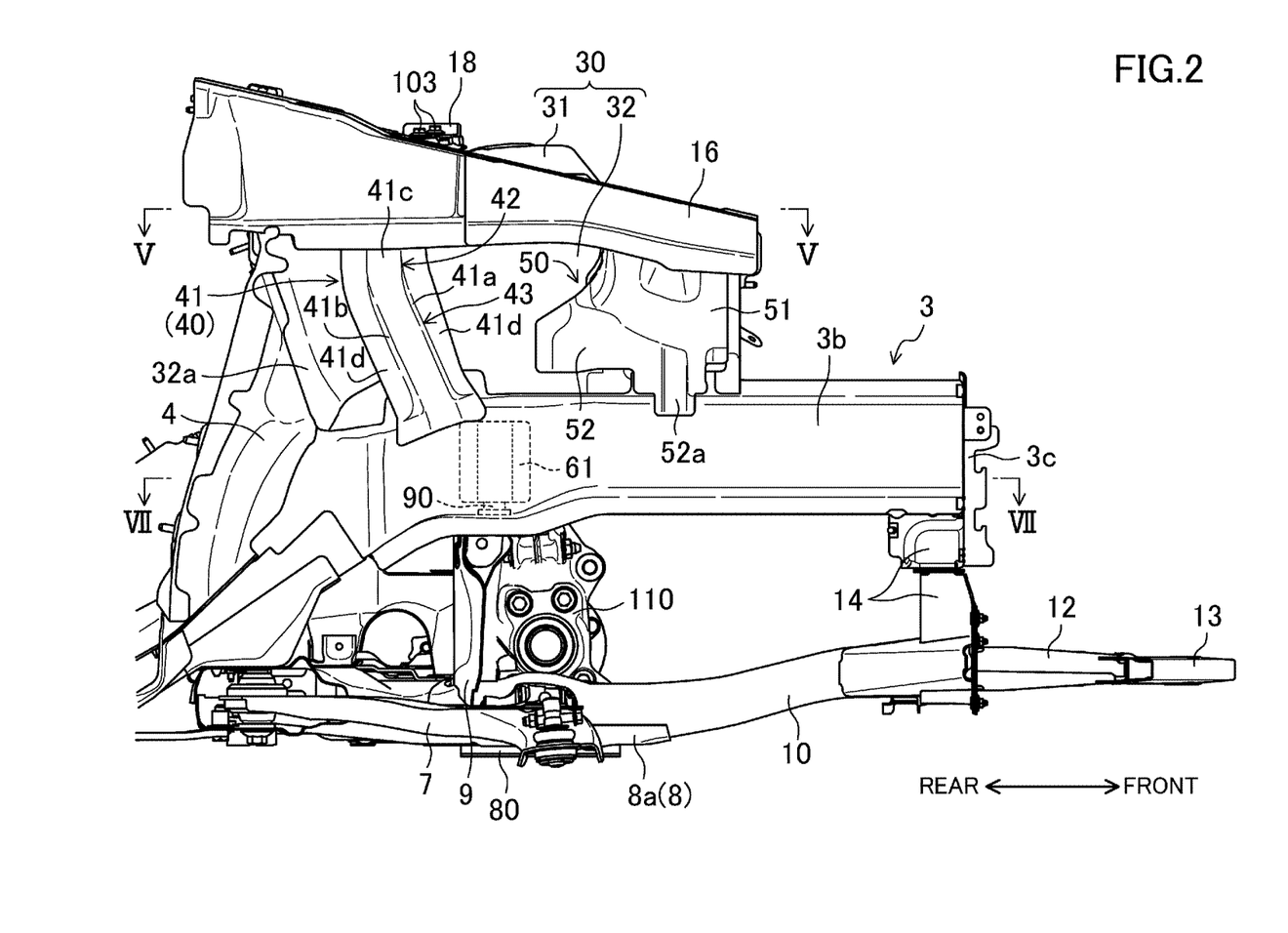
FIG. 2 is a right side view illustrating the front portion of the motor vehicle.
Figure 3:
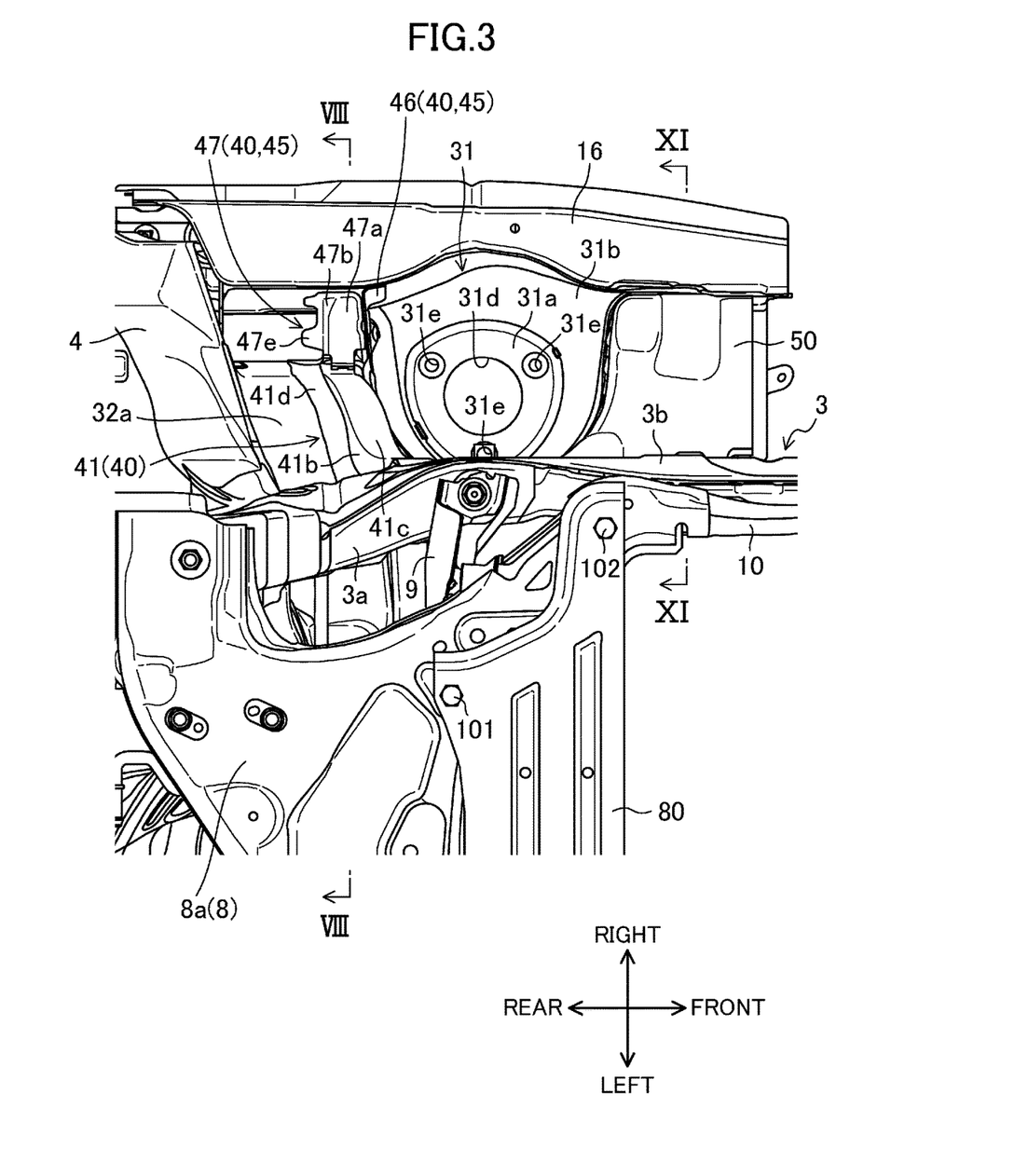
FIG. 3 is a bottom view illustrating a right front portion of the motor vehicle.

Further, a SC member reinforcement 80 (cross member reinforcement) extending in the width direction is detachably attached to the front end of the SC body 8a. As shown in FIG. 2, the SC member reinforcement 80 has a rear end positioned at substantially the same position as the rear frame joints 9 in the longitudinal direction when viewed from the side (from the right in FIG. 2). The SC member reinforcement 80 has a front end positioned forward of the rear frame joints 9. The SC member reinforcement 80 has, as shown in FIG. 3, rear outer ends in the width direction (FIG. 3 shows the right rear outer end only). The rear outer ends are fastened to a bottom surface of the SC body 8a with bolts 101 at substantially the same position as the rear frame joints 9 in the longitudinal direction. A front portion of the SC member reinforcement 80 extends further outward in the width direction than a rear portion thereof. Outer ends of the front portion in the width direction are fastened the bottom surface of the SC body 8a with bolts 102 at a position further rearward than the rear ends of the front extensions 10.

As shown in FIG. 1, each of the front wheel suspension arms 7 is curved so that it extends further outward in the width direction as it goes toward the front. A wheel hub 111 is connected to each of the ends, toward the front and the outside in the width direction, of the front wheel suspension arms 7 via a hub carrier 110. The left and right front wheels are respectively connected to the wheel hubs 111 via hub bolts.

To the left and right hub carriers 110, lower ends of rods 15a of left and right front dampers 15 are connected (FIG. 1 shows the left front damper 15 only). In the front portion of the motor vehicle 1, left and right suspension towers 30 are provided at positions corresponding to the front dampers 15.

Each of the left and right suspension towers 30 is arranged on a sidewall, facing outside in the width direction, of an associated one of the front side frames 3, and extends further upward than the associated one of the front side frames 3. The left and right suspension towers 30 stand upright. The left suspension tower 30 is coupled to a sidewall, facing inside in the width direction, of a left one of a pair of apron reinforcements 16 extending in the longitudinal direction, and the right suspension tower 30 is coupled to a sidewall, facing inside in the width direction, of a right one of the pair of apron reinforcements 16. Specifically, lower ends of the left and right suspension towers 30 are respectively welded to the outer frames 3b of the left and right front side frames 3 (see FIGS. 8 and 9). An upper end (a top 31 which will be described later) of each of the suspension towers 30 is positioned further upward and outward in the width direction than the associated one of the front side frames 3, and is welded to an associated one of the apron reinforcements 16. Each of the left and right suspension towers 30 bulges further toward the engine compartment 2 (toward the inside in the width direction) than the associated one of the apron reinforcements 16. Detailed configuration of the suspension towers 30 will be described later.

Figure 8:
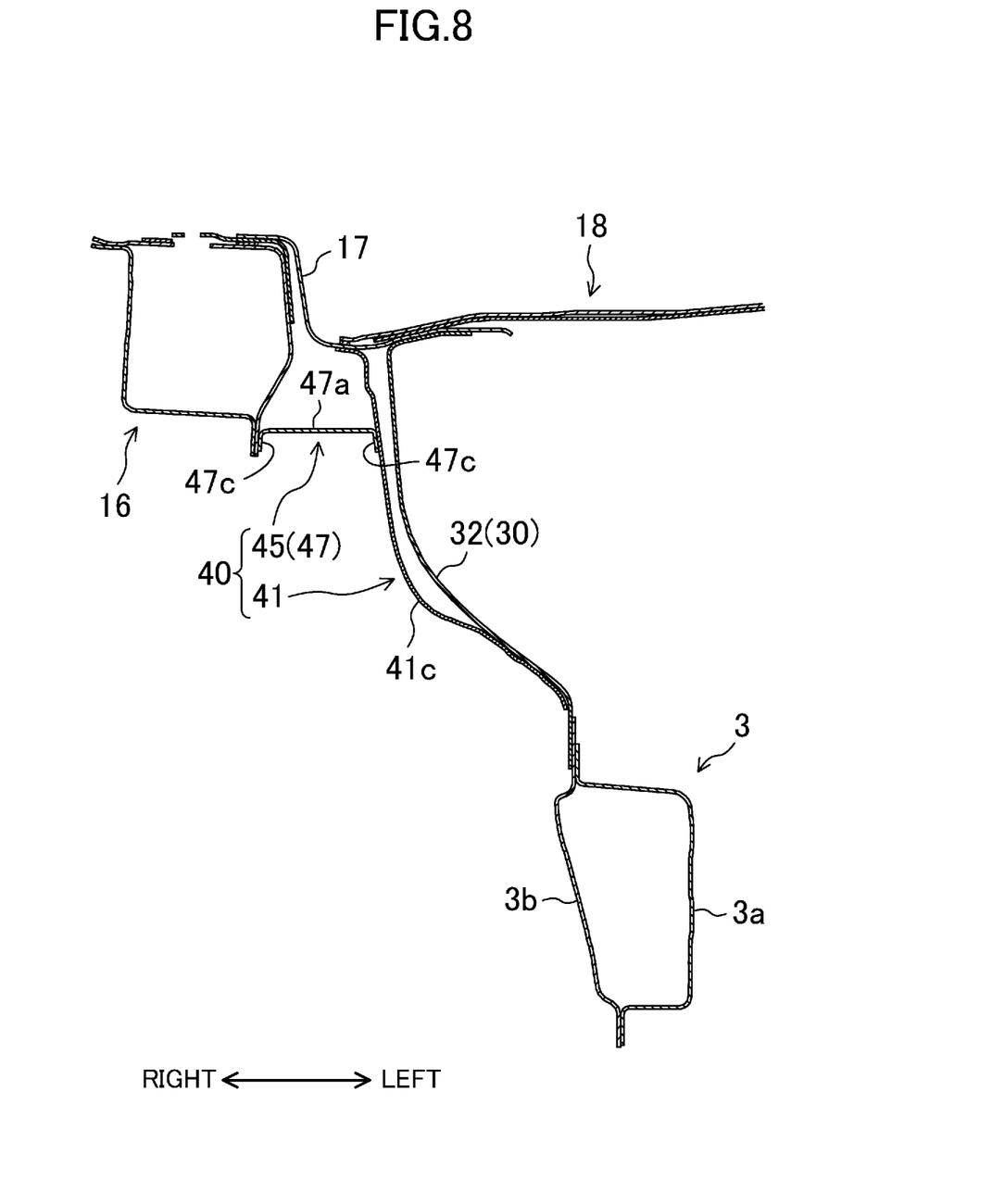
FIG. 8 is a cross-sectional view taken along line VIII-VIII of FIG. 3.
Figure 9:
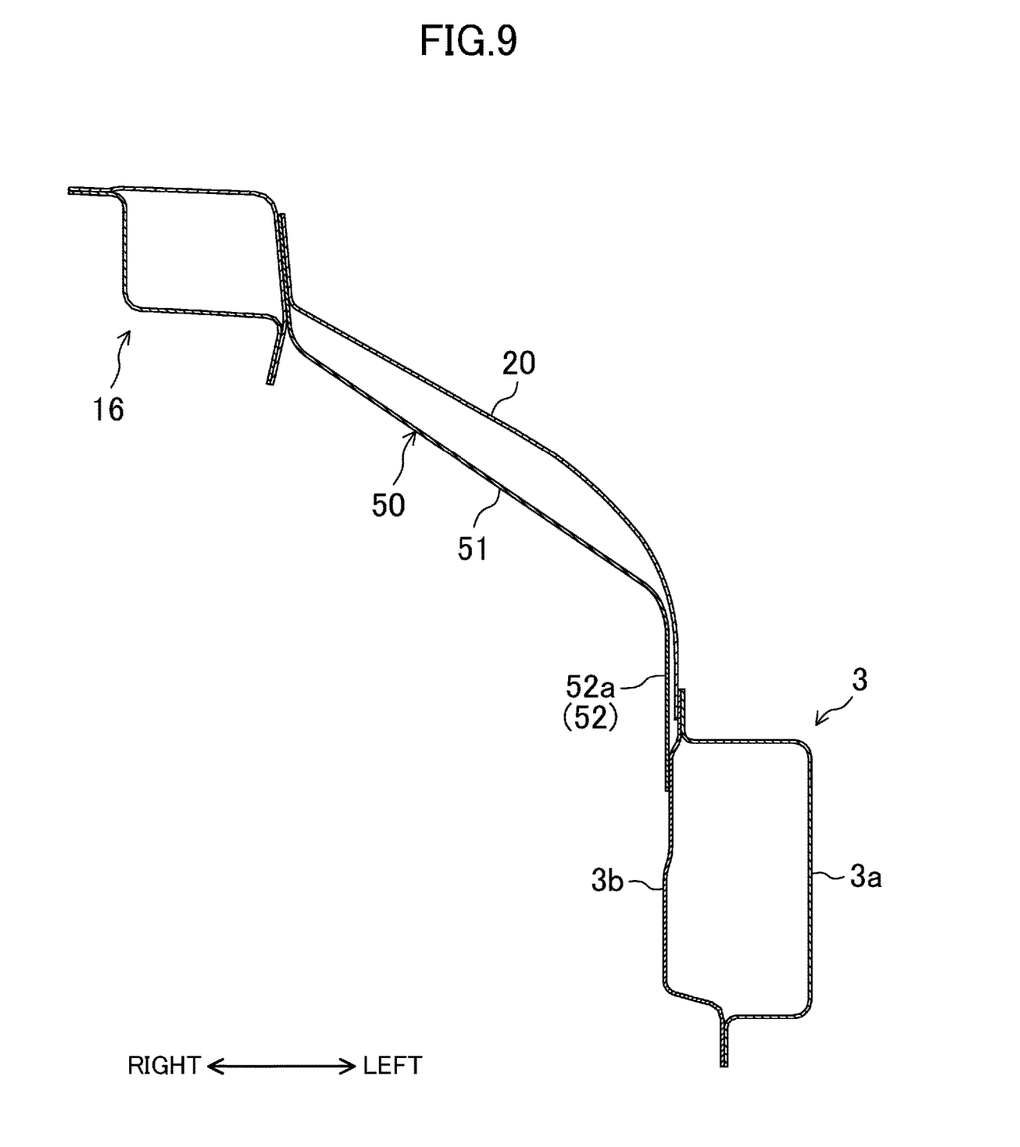
FIG. 9 is a cross-sectional view taken along line IX-IX of FIG. 3.

The left and right apron reinforcements 16 respectively have closed cross sections as shown in FIGS. 8 and 9. The left and right apron reinforcements 16 have rear ends respectively joined to upper ends of left and right pillars (not shown).

A front end of an apron gusset 17 is joined to a rear portion of the upper end (the top 31 which will be described later) of each of the suspension towers 30. As shown in FIG. 1, each of the left and right apron gussets 17 extends to cover a corner formed between the tail of the upper end of the suspension tower 30 and the apron reinforcement 16 when viewed from above. An end of each apron gusset 17 toward the outside in the width direction is joined to an associated one of the apron reinforcements 16.

Each apron gusset 17 is joined to an associated one of ends, toward the outside in the width direction, of a cowl member 18 extending in the width direction with two bolts 103 at substantially the same level as the apron reinforcements 16. Thus, the cowl member 18 and the apron reinforcements 16 are coupled together via the apron gussets 17. Specifically, the apron gussets 17 constitute a pair of left and right couplings which couples the left end of the cowl member 18 to the left apron reinforcement 16, and the right end of the cowl member 18 to the right apron reinforcement

16. The apron gussets 17 couple the suspension towers 30, the apron reinforcements 16, and the cowl member 18 together.

Figure 4:
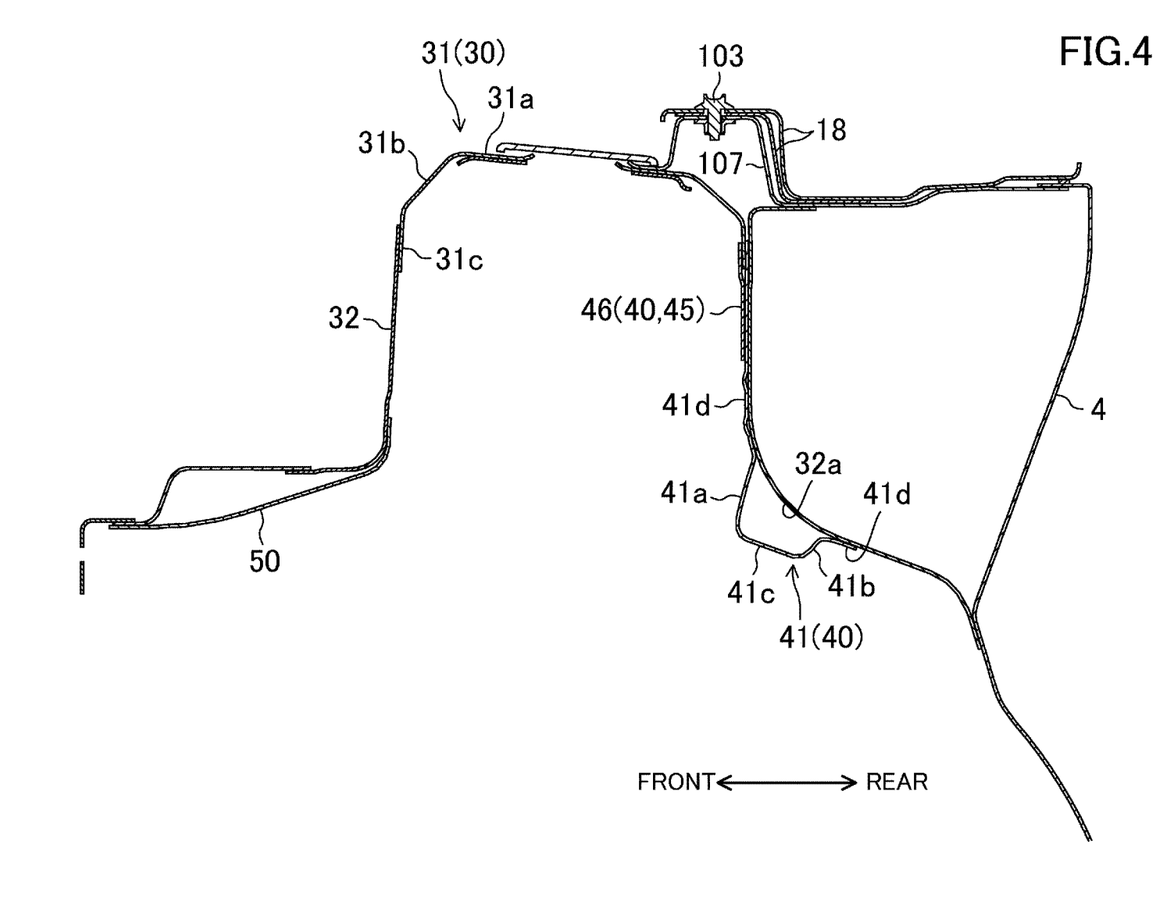
FIG. 4 is a cross-sectional view taken along line IV-IV of FIG. 1.

The cowl member 18 includes two metal plates joined together. Each of the metal plates has a substantially Z-shaped cross section as shown in FIG. 4. Although not shown in detail, the two metal plates of the cowl member 18 form a closed cross section at a position further inside in the width direction than the position shown in FIG. 4.

Wheel apron panels 20 extending in the vertical direction are respectively joined to front ends of the suspension towers 30 (in a strict sense, front ends of peripheral walls 32, which will be described later, of the suspension towers 30). The left wheel apron panel 20 couples the left front side frame 3 to the left apron reinforcement 16, and the right wheel apron panel 20 couples the right front side frame 3 to the right apron reinforcement 16. As shown in FIG. 9, each of the wheel apron panels 20 has a lower end welded to the outer frame 3b of an associated one of the front side frames 3, and an upper end welded to the sidewall, facing inside in the width direction, of an associated one of the apron reinforcements 16.

In this embodiment, two or more reinforcing members are attached to the suspension towers 30. The configurations of the reinforcing members and the suspension towers 30 will be described in detail below. The front structure of this embodiment is basically configured to be bilaterally symmetric, except for slight differences made under layout constraints. Thus, in the following description, only the right suspension tower 30 and reinforcing members attached thereto will be described, and the left suspension tower 30 and reinforcing members attached thereto will not be described in detail. As to paired components disposed on the left and right (e.g., the front side frames 3), description will be made on the right one only.

Figure 5:
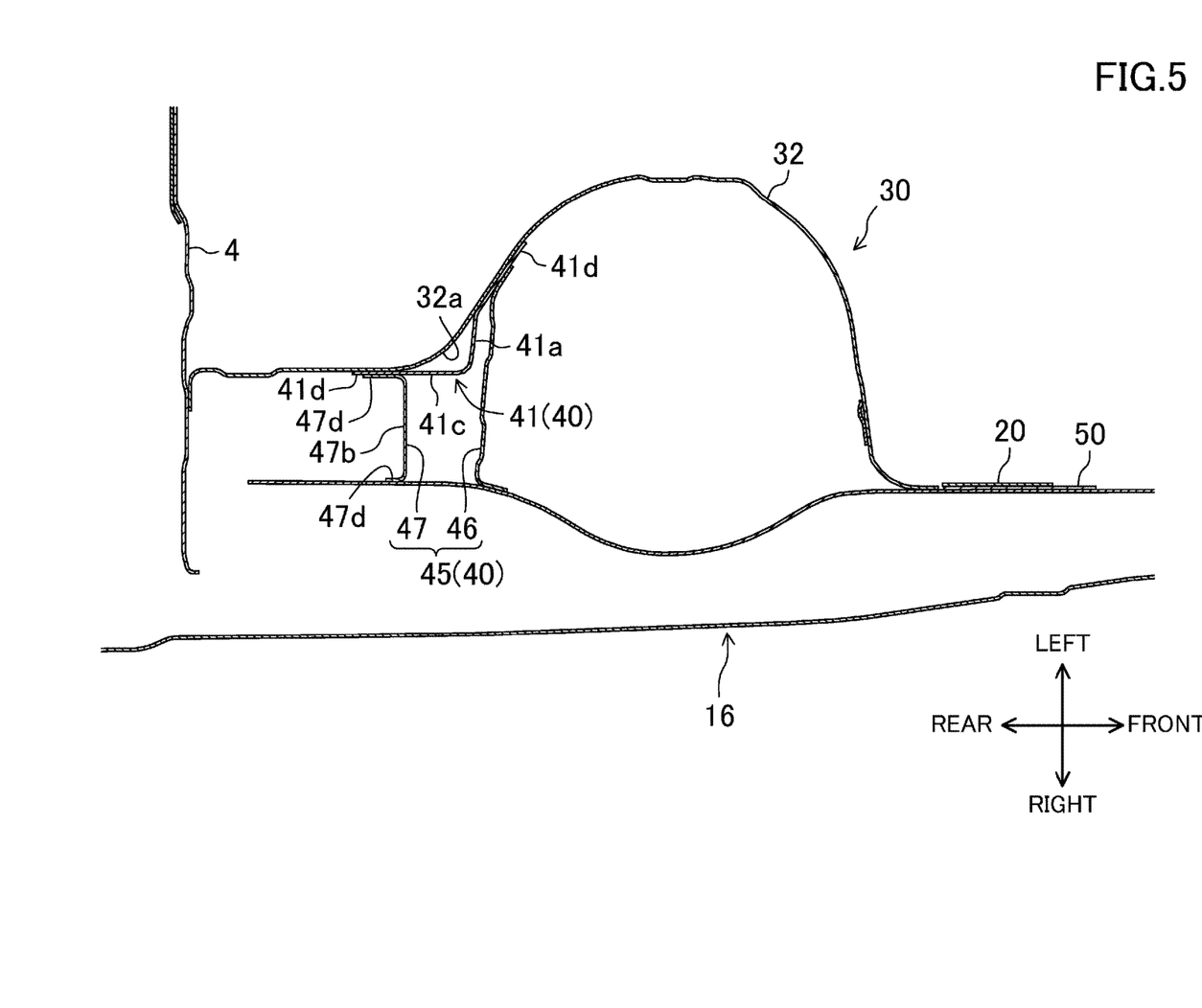
FIG. 5 is a cross-sectional view taken along line V-V of FIG. 2.

As described above, the suspension tower 30 bulges further toward the inside in the width direction (toward the engine compartment 2) than the apron reinforcement 16. As shown in FIGS. 3 and 5, the suspension tower 30 includes an annular top 31 provided with a damper mount 31a on which an upper end of the front damper 15 is mounted, and a substantially semi-cylindrical peripheral wall 32 curved along a portion of the peripheral edge of the top 31 facing the engine compartment 2 (facing the inside in the width direction) to cover the front damper 15 from the engine compartment 2.

As shown in FIG. 4, the top 31 includes the damper mount 31a in the shape of an annular plate, and a skirt 31b flared downward from the peripheral edge of the damper mount 31a. A flange 31c is formed at a lower end, toward the outside in the width direction, of the skirt 31b, and a right portion of the flange 31c is welded to the apron reinforcement 16. A portion of the flange 31c overlaps with, and is welded to, the peripheral wall 32.

As shown in FIG. 3, the damper mount 31a of the top 31 has a through hole 31d in which an upper portion of a rod 15a (see FIG. 1) of the front damper 15 is inserted. A plurality of bolt holes 31e (three in this embodiment) are formed at regular intervals around the through hole 31d of the damper mount 31a. The front damper 15 is mounted on the damper mount 31a when fastening members 104 including bolts and nuts are secured via the bolt holes 31e.

As shown in FIG. 5, the peripheral wall 32 includes a curved wall bent along the peripheral edge of the top 31, and a rear wall extending rearward from a rear end of the curved wall.

As shown in FIG. 8, the rear wall has an upper portion extending substantially straight in the vertical direction, and a portion below the apron reinforcement 16 which is tilted to the left toward the outer frame 3b. An upper end of the rear wall is joined to a lower surface of the apron gusset 17 as shown in FIG. 8. As shown in FIGS. 4 and 5, the rear wall extends rearward in the longitudinal direction from the rear end of the curved wall with a rightward tilt, and then extends further rearward straight in the longitudinal direction. The rear end of the rear wall is joined to a front surface of the dash panel 4.

The reinforcing members attached to the suspension tower 30 include a rear reinforcing member 40 disposed behind the suspension tower 30, and a front reinforcing member 50 disposed in front of the suspension tower 30.

Figure 6:
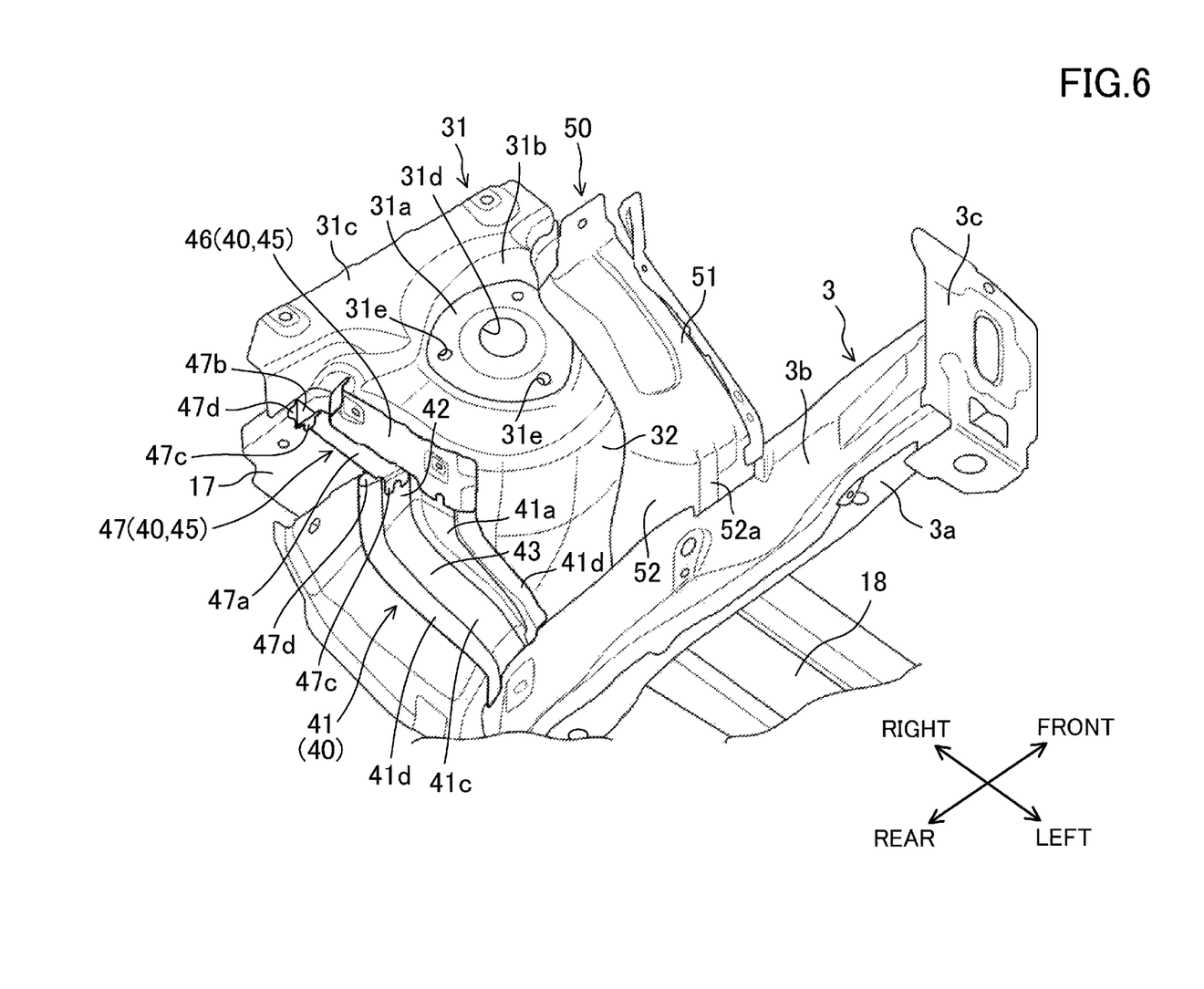
FIG. 6 is a right, front, bottom perspective view illustrating a right suspension tower.

The rear reinforcing member 40 includes, as shown in FIGS. 5, 6, and 8, a first reinforcement 41 and a second reinforcement 45 extending in the width direction to couple the first reinforcement 41 to the apron reinforcement 16. The first reinforcement 41 extends in the vertical direction and is provided for an outer surface, facing the outside in the width direction, of the peripheral wall 32 of the suspension tower 30, i.e., a surface facing opposite to the engine compartment, to form a closed cross section together with a portion of the peripheral wall 32.

As shown in FIG. 2, the first reinforcement 41 includes a vertical portion 42 extending straight in the vertical direction, and a tilted portion 43 extending from a lower end of the vertical portion 42 to be tilted toward the front with respect to the vertical portion as it goes down. The tilted portion 43 does not allow the first reinforcement 41 to interfere with the front damper 15 arranged in the suspension tower 30 and the front wheel. In this embodiment, as shown in FIG. 2, the tilted portion 43 of the first reinforcement 41 is tilted so that the rear frame joint 9 is on a downward extension line from the tilted portion 43 when viewed from the side.

The first reinforcement 41 includes, as shown in FIGS. 2 to 6, a front wall 41a facing forward, a rear wall 41b facing opposite to a portion of the front wall 41a in the longitudinal direction, and an outer sidewall 41c coupling a right end of the front wall 41a to a right end of the rear wall 41b. Welding tabs 41d extend from left ends of the front and rear walls 41a and 41b, respectively. The front welding tab 41d extends forward from the front wall 41a, and the rear welding tab 41d extends rearward from the rear wall 41b. The welding tabs 41d are welded to the outer surface 32a of the peripheral wall 32 of the suspension tower 30.

A lower end of the first reinforcement 41 is welded to the outer frame 3b of the front side frame 3 as shown in FIG. 6. An upper end of the first reinforcement 41 is welded to the apron gusset 17 as shown in FIG. 8. Thus, as shown in FIG. 8, the upper end of the first reinforcement 41 is coupled to the cowl member 18 via the apron gusset 17. Further, as shown in FIGS. 2 and 8, the upper end of the first reinforcement 41 partially overlaps with the cowl member 18 in the longitudinal direction.

The front wall 41a of the first reinforcement 41 is formed to be wider as it goes upward as shown in FIG. 6. Specifically, the tilted portion 43 is formed to be gradually wider as it goes upward, while the vertical portion 42 has a constant width. The rear wall 41b of the first reinforcement 41 is provided only for the tilted portion 43 of the first reinforcement 41 as shown in FIGS. 3 and 5, and is formed to be wider as it goes downward. The outer sidewall 41c of the first reinforcement 41 has a dimension in the longitudinal direction substantially constant in the vertical direction.

Thus, as shown in FIG. 5, a triangular closed cross section is formed by the vertical portion 42 of the first reinforcement 41 and the outer surface 32a of the peripheral wall 32. Further, as shown in FIG. 4, a rectangular closed cross section is formed by the tilted portion 43 of the first reinforcement 41 and the outer surface 32a of the peripheral wall 32. Note that the closed cross section of the first reinforcement 41 varies in shape in the vertical direction, but does not vary in area in the vertical direction.

As shown in FIGS. 3 and 6, the second reinforcement 45 includes a flat first panel 46 and a second panel 47 having an L-shaped cross section.

The first panel 46 extends in the width direction as shown in FIGS. 5 and 6. A left end of the first panel 46 is welded to the top 31 of the suspension tower 30 and the first reinforcement 41. A right end of the first panel 46 is welded to a left sidewall of the apron reinforcement 16 (see, in particular, FIG. 5).

As shown in FIG. 6, the second panel 47 includes a second bottom wall portion 47a, and a second rear wall portion 47b extending upward from a rear end of the second bottom wall portion 47a. As shown in FIGS. 6 and 8, lower welding tabs 47c extend downward from right and left ends of the second bottom wall portion 47a. The lower welding tab 47c on the right is welded to the left sidewall of the apron reinforcement 16. The lower welding tab 47c on the left is welded to the outer sidewall 41c of the first reinforcement 41. Further, as shown in FIGS. 5 and 6, rear welding tabs 47d extend rearward from right and left ends of the second rear wall portion 47b. The right rear welding tab 47d is welded to the left sidewall of the apron reinforcement 16. The left rear welding tab 47d is welded to the rear welding tab 41d of the first reinforcement 41.

As shown in FIG. 3, an upper welding tab 47e extends rearward from an upper end of the rear wall portion 47b of the second panel 47. The upper welding tab 47e is welded to a lower surface of the apron gusset 17. Thus, the first and second panels 46 and 47, the top 31 of the suspension tower 30, and the apron gusset 17 form a space having a closed cross section and extending in the width direction.

A junction between the right lower welding tab 47c of the second panel 47 and the apron reinforcement 16 is substantially at the same position as the cowl member 18 in the longitudinal direction as shown in FIG. 8. Specifically, the junction between the rear reinforcing member 40 and the apron reinforcement 16 is substantially at the same position as the cowl member 18 in the longitudinal direction.

As shown in FIG. 9, the front reinforcing member 50 extends in the vertical direction, and is provided on a surface of the wheel apron panel 20 opposite to the engine compartment 2 (a surface facing outside in the width direction) so as to couple the outer frame 3b of the front side frame 3 to the left sidewall of the apron reinforcement 16 (the sidewall facing outside in the width direction). As shown in FIG. 9, the wheel apron panel 20 and the front reinforcing member 50 form a closed cross section.

The front reinforcing member 50 includes, as shown in FIGS. 2 and 3, an upper portion 51 and a lower portion 52. The upper portion 51 is a relatively upper portion of the front reinforcing member 50 and extends vertically with a substantially constant longitudinal dimension. The lower portion 52 extends rearward and downward from a lower end of the upper portion 51. The upper portion 51 is tilted to the left as it goes downward as shown in FIG. 9. The lower portion 52 extends straight downward from the lower end of the upper portion 51.

The upper portion 51 forms a closed cross section with the wheel apron panel 20 as shown in FIG. 9. The lower portion 52 is basically joined to the wheel apron panel 20 and the outer frame 3b of the front side frame 3. As shown in FIG. 2, a bulge 52a is formed to bulge toward the right from a front portion of the lower portion 52. As shown in FIG. 9, the bulge 52a and the wheel apron panel 20 form a closed cross section.

As described above, the front and rear reinforcing members 50 and 40 thus provided form an annular structure surrounding the top 31 of the suspension tower 30 together with the front side frame 3, the apron reinforcement 16, and the wheel apron panel 20.

In this embodiment, the right suspension tower 30 and the reinforcing members 40 and 50 attached to the right suspension tower 30 are configured as described above. The left suspension tower 30 and the reinforcing members attached to the left suspension tower 30, which are configured in a slightly different manner due to layout constraints, are basically bilaterally symmetric with the right suspension tower 30 and the reinforcing members 40 and 50 attached to the right suspension tower 30.

In this embodiment, a plurality of ribs 60 for reinforcement are disposed in each of the left and right front side frames 3.

Figure 7:
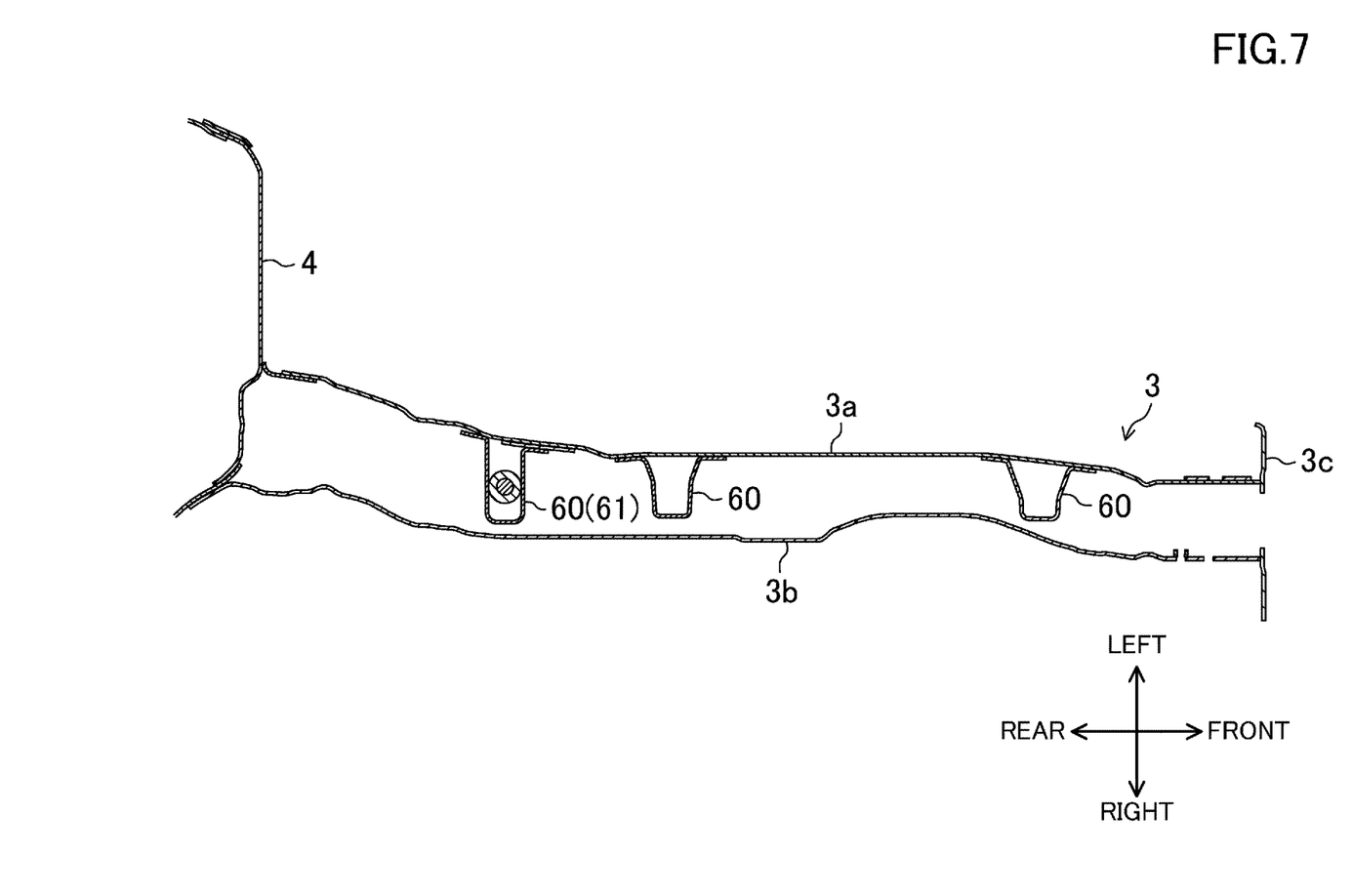
FIG. 7 is a cross-sectional view taken along line VII-VII of FIG. 2.

FIG. 7 shows the interior of the right front side frame 3. In the interior of the right front side frame 3, as shown in FIG. 7, three ribs 60 are disposed. Each rib 60 has a U-shaped cross section which opens to the left (toward the inside in the width direction), and is welded to the left sidewall of the inner frame 3a. Thus, each rib 60 and the inner frame 3a form a closed cross section.

As shown in FIG. 2, a rearmost rib 61, which is the rearmost one of the three ribs 60, is at substantially the same position as the rear frame joint 9 in the longitudinal direction. As shown in FIG. 7, a weld nut 90 extends vertically inside the front side frame 3 at a position corresponding to the junction with the rear frame joint 9. A bolt for connecting the rear frame joint 9 to the inner frame 3a is fastened to the weld nut 90. The rearmost rib 61 is arranged to cover the weld nut 90. Thus, as shown in FIG. 2, the rearmost rib 61 is arranged to extend from the junction between the rear reinforcing member 40 and the front side frame 3 to the junction between the rear frame joint 9 of the SC member 8 and the front side frame 3. Front and rear walls of the rearmost rib 61 respectively have surfaces facing the weld nut 90, which are welded to an outer peripheral surface of the weld nut 90.

Each rib 60 is not limited to have the U-shaped cross section, and may be in the shape of a flat plate, for example. Also in this case, the rearmost rib 61 is welded to the weld nut 90. Alternatively, at least one of the ribs may be flat, and the rest of them may have U-shaped cross sections. At least one of the front and rear walls of the rearmost rib 61 may be provided with a U-shaped notch at a lower end thereof so that the weld nut 90 is located in the notch.

The inside of the left front side frame 3 is configured to be bilaterally symmetric with that of the right front side frame 3 described above.

Since the front structure of the motor vehicle 1 of this embodiment has been configured as described above, an annular structure 70 is formed by the left and right front side frames 3, the left and right apron reinforcements 16, the left and right suspension towers 30, the SC member 8 (in particular, the SC body 8a and the rear frame joints 9), the cowl member 18, and the left and right rear reinforcing members 40. Particularly in this embodiment, the front side frames 3, the apron reinforcements 16, the SC body 8a, and the cowl member 18 respectively have closed cross sections. Each of the left and right suspension towers 30 and an associated one of the first reinforcements 41 of the left and right rear reinforcing members 40 form a closed cross section. Each of the left and right apron gussets 17 and an associated one of the second reinforcements 45 of the left and right rear reinforcing members 40 form a closed cross section. Thus, the annular structure 70 is formed by these closed cross sections. The annular structure 70 thus formed can improve the overall rigidity of the front portion of the vehicle, in particular, the rigidity in the width and vertical directions.

Particularly in this embodiment, each rear reinforcing member 40 includes the first and second reinforcements 41 and 45. The first reinforcement 41 couples the front side frame 3 and the cowl member 18 via the apron gusset 17. Thus, in addition to the annular structure 70, another annular structure coupling the front side frames 3 and the cowl member 18 without the apron reinforcements 16 is formed by the left and right front side frames 3, the left and right suspension towers 30, the SC member 8, the cowl member 18, and the left and right rear reinforcing members 40. The additional annular structure can further improve the overall rigidity of the front portion of the vehicle together with the annular structure 70.

The improved overall rigidity of the front portion of the vehicle does not allow the vehicle body to be deformed easily even if a load is applied thereto from the road surface via the front wheels. This can stabilize the adhesion of the front wheels to the road surface, i.e., a camber angle, and reduce adverse effects to the steering stability.

The rear reinforcing member 40 extends in the vertical and width directions so as to couple the front side frame 3 with the apron reinforcement 16. The rear reinforcing member 40 and the peripheral wall 32 of the suspension tower 30 form a closed cross section. Thus, for example, even if a load is applied from the outside in the width direction (from the outside toward the engine compartment 2) to the suspension tower 30 via the apron reinforcement 16, the rear reinforcing member 40 can appropriately receive the load, thereby reducing the deformation of the suspension tower 30. Further, even if the suspension tower 30 receives a load applied from the inside in the width direction (from the engine compartment 2), the rear reinforcing member 40 becomes tense against the apron reinforcement 16 so that the rear reinforcing member 40 and the apron reinforcement 16 can appropriately receive the load. This can reduce the deformation of the suspension tower 30. This can improve the rigidity of the suspension tower 30 against the load applied in the width direction.

Particularly in this embodiment, the second reinforcement 45 extends in the width direction, and a space extending in the width direction and having a closed cross section is formed by the second reinforcement 45, the top 31 of the suspension tower 30, and the apron gusset 17. This can further improve the rigidity of the suspension tower 30 against the load applied in the width direction.

Moreover, in this embodiment, the rearmost rib 61 which divides the inside of the front side frame 3 in the longitudinal direction is disposed to extend from the junction between the rear reinforcing member 40 and the front side frame 3 to the junction between the rear frame joint 9 of the SC member 8 and the front side frame 3. Thus, the lower end of the rear reinforcing member 40 and the rear frame joint 9 of the SC member 8 are coupled together via the rearmost rib 61. This can further improve the rigidity of the front portion of the vehicle having the annular structure 70. Having a U-shaped cross section which opens inward in the width direction, the rearmost rib 61 can further improve its rigidity, in particular against the load applied in the vertical direction, than a rearmost rib 61 in the shape of a flat plate. This can further improve the rigidity of the front portion of the vehicle body.

Further, in this embodiment, the front reinforcing member 50 coupling the front side frame 3 to the apron reinforcement 16 is provided in front of the suspension tower 30. Thus, the annular structure surrounding the top 31 of the suspension tower 30 (i.e., the periphery of the damper mount 31a) is formed by the front side frame 3, the apron reinforcement 16, the suspension tower 30, the wheel apron panel 20, and the rear and front reinforcing members 40 and 50. This can improve the rigidity of the top 31 of the suspension tower 30 against the load applied in the longitudinal, width, and vertical directions. Particularly in this embodiment, the front side frame 3 and the apron reinforcement 16 respectively have closed cross sections. Each of the left and right suspension towers 30 forms a closed cross section with an associated one of the first reinforcements 41 of the left and right rear reinforcing members 40. Each of the left and right apron gussets 17 forms a closed cross section with an associated one of the second reinforcements 45 of the left and right rear reinforcing members 40. Further, each of the wheel apron panels 20 forms a closed cross section with an associated one of the front reinforcing members 50. Thus, the annular structure surrounding the top 31 of the suspension tower 30 is formed by these closed cross sections. This can further improve the overall rigidity of the suspension towers 30.

Further, in this embodiment, the SC member reinforcement 80 extending in the width direction is detachably attached to the front end of the SC body 8a. When viewed from the side, the SC member reinforcement 80 has a front end positioned further forward than the rear frame joints 9. This can increase the effective dimension of the SC body 8a in the longitudinal direction, thereby improving the rigidity of the SC body 8a itself. In this configuration, the annular structure 70 including the SC member 8 can further improve the rigidity of the front portion of the vehicle body.

The SC member reinforcement 80 is detachably attached to the SC body 8a. Therefore, if the SC member reinforcement 80 becomes an obstacle to the maintenance of the engine, for example, the SC member reinforcement 80 can be detached before the maintenance. This can reduce the possible decrease in engine maintainability as compared with the cases where the SC body 8a itself is upsized, or the SC body 8a is positioned further forward.

Therefore, the front structure of the motor vehicle according to this embodiment includes: a pair of left and right front side frames respectively disposed at ends of an engine compartment of the motor vehicle in a width direction of the motor vehicle and extending in a longitudinal direction of the motor vehicle; a pair of left and right apron reinforcements respectively disposed above, and further outside in the width direction of the motor vehicle than, the left and right front side frames, the apron reinforcements extending in the longitudinal direction of the motor vehicle; a pair of left and right suspension towers standing upright to couple the left front side frame to the left apron reinforcement, and the right front side frame to the right apron reinforcement, each of the suspension towers bulging further toward the engine compartment than an associated one of the apron reinforcements; a suspension cross member disposed below the left and right front side frames and connecting the left and right front side frames in the width direction of the motor vehicle; and a cowl member extending in the width direction of the motor vehicle to be coupled to the apron reinforcements, wherein each of the suspension towers includes a top on which a damper of a front wheel suspension is mounted, and a peripheral wall provided along a periphery of the top facing the engine compartment and covering the damper from the engine compartment, a reinforcing member is provided on a surface, facing outside in the width direction of the motor vehicle, of the peripheral wall of each suspension tower, the reinforcing members extending in a vertical direction and the width direction of the motor vehicle to couple the left front side frame to the left apron reinforcement, and the right front side frame to the right apron reinforcement, and a portion of each of the peripheral walls and an associated one of the reinforcing members form a closed cross section. Thus, the overall rigidity of the front portion of the vehicle can be improved, and the suspension towers 30 can be improved in rigidity against a load applied in the width direction.

The present disclosure is not limited to the embodiments described above, and can be modified within the scope of the claims.

For example, in this embodiment, the rear reinforcing member 40 includes the first and second reinforcements 41 and 45 configured as separate parts. Alternatively, the first and second reinforcements 41 and 45 may be integrated together. In such a case, a portion corresponding to the first reinforcement 41 is not necessarily joined to the apron gusset 17.

The embodiments described above are merely exemplary ones in nature, and do not intend to limit the scope of the present disclosure. The scope of the present disclosure is defined by the appended claims, and all variations and modifications belonging to a range equivalent to the range of the claims are within the scope of the present disclosure.

What is claimed is:

1. A front structure of a motor vehicle, comprising:
a pair of left and right front side frames respectively disposed at ends of an engine compartment of the motor vehicle in a width direction of the motor vehicle and extending in a longitudinal direction of the motor vehicle;
a pair of left and right apron reinforcements respectively disposed above, and further outside in the width direction of the motor vehicle than, the left and right front side frames, the apron reinforcements extending in the longitudinal direction of the motor vehicle;
a pair of left and right suspension towers standing upright to couple the left front side frame to the left apron reinforcement, and the right front side frame to the right apron reinforcement, each of the suspension towers bulging further toward the engine compartment than an associated one of the apron reinforcements;
a suspension cross member disposed below the left and right front side frames and connecting the left and right front side frames in the width direction of the motor vehicle; and
a cowl member extending in the width direction of the motor vehicle to be coupled to the apron reinforcements, wherein
each of the suspension towers includes a top on which a damper of a front wheel suspension is mounted, and a peripheral wall provided along a periphery of the top facing the engine compartment and covering the damper from the engine compartment,
a reinforcing member is provided on a surface, facing outside in the width direction of the motor vehicle, of the peripheral wall of each suspension tower, the reinforcing members extending in a vertical direction and the width direction of the motor vehicle to couple the left front side frame to the left apron reinforcement, and the right front side frame to the right apron reinforcement, and
a portion of each of the peripheral walls and an associated one of the reinforcing members form a closed cross section.

2. The front structure of claim 1, wherein
each of the front side frames has a closed cross section, and
a rib is disposed in an interior of each front side frame to divide the interior in the longitudinal direction of the motor vehicle, the rib extending from a junction between the reinforcing member and the front side frame to a junction between the suspension cross member and the front side frame.

3. The front structure of claim 2, wherein
the rib has a U-shaped cross section which opens inward or outward in the width direction of the motor vehicle.

4. The front structure of claim 1, wherein
the suspension cross member includes a cross member body extending in the width direction of the motor vehicle,
the suspension cross member is coupled to the front side frames via frame joints respectively extending upward from ends of the cross member body, the ends being toward outside in the width direction of the motor vehicle, and toward the front of the motor vehicle,
a cross member reinforcement extending in the width direction of the motor vehicle is detachably attached to a front end of the cross member body, and
a front end of the cross member reinforcement is positioned further forward than the frame joints when viewed from a lateral side of the motor vehicle.

5. The front structure of claim 1, wherein
each of the reinforcing members includes:
a first reinforcement extending in the vertical direction, being attached to a surface of the peripheral wall of the suspension tower facing outside in the width direction of the motor vehicle to form a closed cross section with a portion of the peripheral wall, and being coupled to the cowl member; and
a second reinforcement extending in the width direction of the motor vehicle to couple the first reinforcement to the apron reinforcement.

6. The front structure of claim 1, further comprising:
a pair of wheel apron panels each extending in the vertical direction, and being joined to a front end of the peripheral wall of an associated one of the suspension towers, the wheel apron panels coupling the left front side frame to the left apron reinforcement, and the right front side frame to the right apron reinforcement, wherein
each reinforcing member is positioned behind an associated one of the suspension towers,
a front reinforcing member is disposed in front of each suspension tower on a surface, facing outside in the width direction of the motor vehicle, of each of the wheel apron panels, the front reinforcing members being different from the reinforcing members,
each of the wheel apron panels and an associated one of the front reinforcing members form a closed cross section.

7. The front structure of claim 2, wherein
the suspension cross member includes a cross member body extending in the width direction of the motor vehicle,
the suspension cross member is coupled to the front side frames via frame joints respectively extending upward from ends of the cross member body, the ends being toward outside in the width direction of the motor vehicle, and toward the front of the motor vehicle,
a cross member reinforcement extending in the width direction of the motor vehicle is detachably attached to a front end of the cross member body, and
a front end of the cross member reinforcement is positioned further forward than the frame joints when viewed from a lateral side of the motor vehicle.

8. The front structure of claim 2, wherein
each of the reinforcing members includes:
a first reinforcement extending in the vertical direction, being attached to a surface of the peripheral wall of the suspension tower facing outside in the width direction of the motor vehicle to form a closed cross section with a portion of the peripheral wall, and being coupled to the cowl member; and
a second reinforcement extending in the width direction of the motor vehicle to couple the first reinforcement to the apron reinforcement.

9. The front structure of claim 2, wherein
a pair of wheel apron panels each extending in the vertical direction, and being joined to a front end of the peripheral wall of an associated one of the suspension towers, the wheel apron panels coupling the left front side frame to the left apron reinforcement, and the right front side frame to the right apron reinforcement, wherein
each reinforcing member is positioned behind an associated one of the suspension towers,
a front reinforcing member is disposed in front of each suspension tower on a surface, facing outside in the width direction of the motor vehicle, of each of the wheel apron panels, the front reinforcing members being different from the reinforcing members,
each of the wheel apron panels and an associated one of the front reinforcing members form a closed cross section.

10. The front structure of claim 4, wherein
each of the reinforcing members includes:
a first reinforcement extending in the vertical direction, being attached to a surface of the peripheral wall of the suspension tower facing outside in the width direction of the motor vehicle to form a closed cross section with a portion of the peripheral wall, and being coupled to the cowl member; and
a second reinforcement extending in the width direction of the motor vehicle to couple the first reinforcement to the apron reinforcement.

11. The front structure of claim 4, wherein
a pair of wheel apron panels each extending in the vertical direction, and being joined to a front end of the peripheral wall of an associated one of the suspension towers, the wheel apron panels coupling the left front side frame to the left apron reinforcement, and the right front side frame to the right apron reinforcement, wherein
each reinforcing member is positioned behind an associated one of the suspension towers,
a front reinforcing member is disposed in front of each suspension tower on a surface, facing outside in the width direction of the motor vehicle, of each of the wheel apron panels, the front reinforcing members being different from the reinforcing members,
each of the wheel apron panels and an associated one of the front reinforcing members form a closed cross section.

12. The front structure of claim 5, wherein
a pair of wheel apron panels each extending in the vertical direction, and being joined to a front end of the peripheral wall of an associated one of the suspension towers, the wheel apron panels coupling the left front side frame to the left apron reinforcement, and the right front side frame to the right apron reinforcement, wherein
each reinforcing member is positioned behind an associated one of the suspension towers,
a front reinforcing member is disposed in front of each suspension tower on a surface, facing outside in the width direction of the motor vehicle, of each of the wheel apron panels, the front reinforcing members being different from the reinforcing members,
each of the wheel apron panels and an associated one of the front reinforcing members form a closed cross section.

* * * * *